US006886778B2

(12) United States Patent
McLean

(10) Patent No.: US 6,886,778 B2
(45) Date of Patent: May 3, 2005

(54) EFFICIENT WING TIP DEVICES AND METHODS FOR INCORPORATING SUCH DEVICES INTO EXISTING WING DESIGNS

(75) Inventor: James D. McLean, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/611,212

(22) Filed: Jun. 30, 2003

(65) Prior Publication Data

US 2004/0262451 A1 Dec. 30, 2004

(51) Int. Cl.⁷ ................................................. B64C 5/08
(52) U.S. Cl. ..................................... 244/45 R; 244/91
(58) Field of Search ............................... 244/45 R, 91, 244/199, 123, 35 R

(56) References Cited

U.S. PATENT DOCUMENTS

| | | | |
|---|---|---|---|
| 4,172,574 A | 10/1979 | Spillman | |
| 4,205,810 A | 6/1980 | Ishimitsu | |
| 4,455,004 A | * 6/1984 | Whitaker, Sr. | ............ 244/90 R |
| 4,671,473 A | * 6/1987 | Goodson | .................... 244/199 |
| 4,722,499 A | * 2/1988 | Klug | .......................... 244/199 |
| 5,102,068 A | 4/1992 | Gratzer | |
| 5,275,358 A | 1/1994 | Goldhammer et al. | |
| 5,348,253 A | 9/1994 | Gratzer | |
| 5,634,613 A | 6/1997 | McCarthy | |
| 6,345,790 B1 | * 2/2002 | Brix | ........................... 244/199 |
| 6,484,968 B2 | 11/2002 | Felker | |
| 6,547,181 B1 | 4/2003 | Hoisington et al. | |

FOREIGN PATENT DOCUMENTS

EA        0 094 064 A     11/1983

OTHER PUBLICATIONS www.boeing.com/commercial/aeromagazine/aero_17/wingtip_devices.html.*
Whitcomb, Richard T, NASA Technical Note, NASA TN D–8260, "A Design Approach and Selected Wind–Tunnel Results at High Subsonic Speeds for Wing–Tip Mounted Winglets," National Aeronautics and Space Administration, Washington, D.C., Jul. 1976 (33 pages).*
Design and Analysis of Winglets for Military Aircraft, Technical Report AFFDL–TR–76–3, Feb. 1976 (pp. 88–143).*
Wing Design Parameters (4 pages) http://www.desktopaero-.com/appliedaero/wingdesign/wingparams.html [Accessed Jun. 12, 2003].
European Search Report for Application No. EP 04 07 6872, dated Sep. 14, 2004, European Patent Office, 3 pgs.

* cited by examiner

Primary Examiner—Peter M. Poon
Assistant Examiner—Timothy D. Collins
(74) Attorney, Agent, or Firm—Perkins Coie LLP

(57) ABSTRACT

Efficient wing tip devices for use with aircraft wings. In one embodiment, an aircraft wing/winglet combination includes a wing having a wing root portion and a wing tip portion spaced apart from the wing root portion. The wing tip portion can have a wash-out twist relative to the wing root portion. The aircraft wing/winglet combination can further include a winglet extending from the wing tip portion of the wing. The winglet can be swept at least generally forward relative to the wing to favorably change the lift distribution on the wing and in turn reduce the induced drag on the wing.

33 Claims, 4 Drawing Sheets

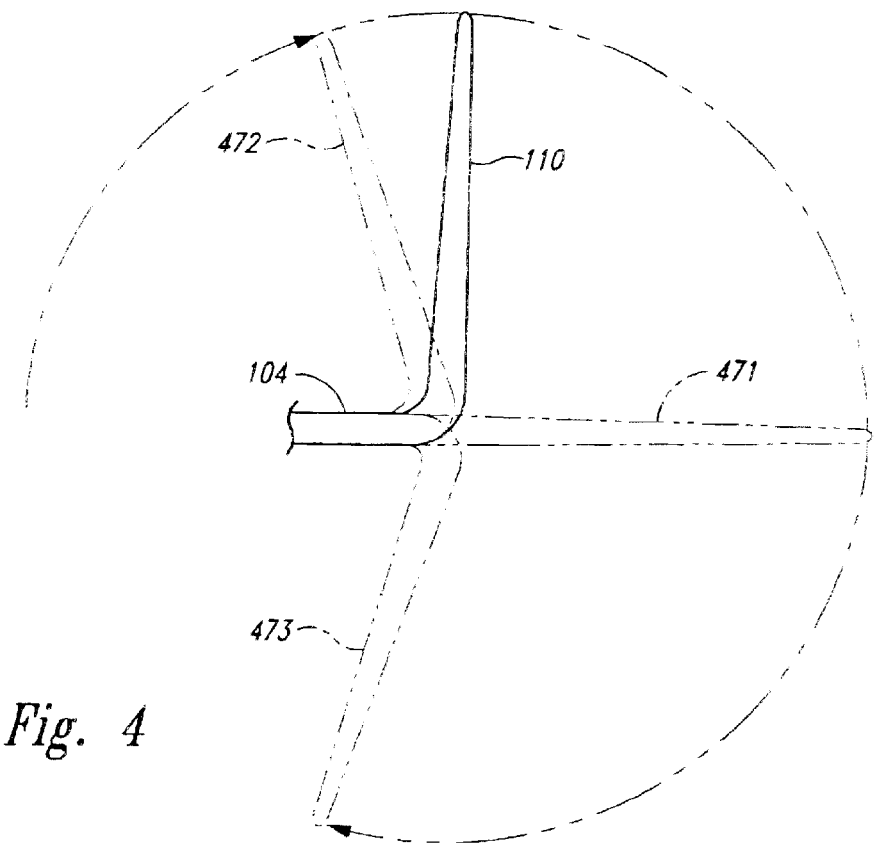
Fig. 4
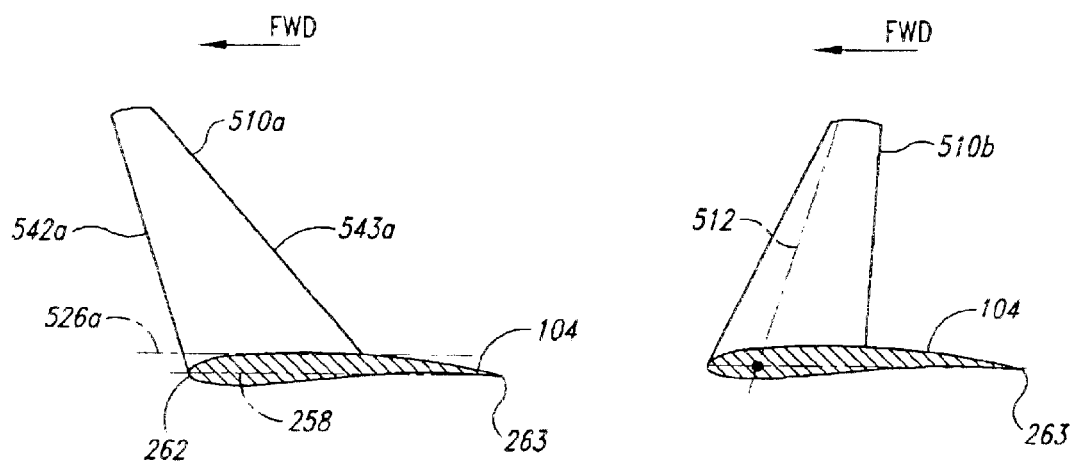
Fig. 5A
Fig. 5B

| SPANLOAD | WINGLET SWEEP | ΔD_i RELATIVE TO SPANLOAD 2, AS % OF SPANLOAD 1 |
|---|---|---|
| 4 | 35 DEGREES (AFT) | -6.3 |
| 5 | -35 DEGREES (FORWARD) | -7.9 |

EFFICIENT WING TIP DEVICES AND METHODS FOR INCORPORATING SUCH DEVICES INTO EXISTING WING DESIGNS

TECHNICAL FIELD

The following disclosure relates generally to wing tip devices such as winglets and, more particularly, to wing tip devices for use with existing aircraft wing designs.

BACKGROUND

The idea of using winglets to reduce induced drag on aircraft wings was studied by Richard Whitcomb of NASA and others in the 1970s. Since then, a number of variations on this idea have been patented (see, for example, U.S. Pat. No. 4,205,810 to Ishimitsu and U.S. Pat. No. 5,275,358 to Goldhammer, et al.). In addition, a number of winglet variations are currently in service. Such winglets include horizontal span extensions, like those of the Boeing 767-400 and 777-400 aircraft, and aft-swept span extensions canted upward or downward at various angles. These devices can be added to a new wing during the initial design phase of an all-new aircraft, or they can be added to an existing wing as a retrofit or during development of a derivative model.

The induced drag of a wing or a wing/winglet combination can be calculated with reasonable accuracy using the classic "Trefftz plane theory." According to this theory, the induced drag of an aircraft wing depends only on the trailing edge trace of the "lifting system" (i.e., the wing plus tip device), as viewed directly from the front or rear of the wing, and the "spanload." The spanload is the distribution of aerodynamic load perpendicular to the trailing edge trace of the wing. (Aerodynamicists often refer to this aerodynamic load distribution as "lift," even though the load is not vertical when the trailing edge trace is tilted from horizontal.) Adding a winglet or other wing tip device to a wing changes both the trailing edge trace (i.e., the "Trefftz-plane geometry") and the spanload. As a result, adding such a device also changes the induced drag on the wing.

For a given Trefftz-plane geometry and a given total vertical lift, there is generally one spanload that gives the lowest possible induced drag. This is the "ideal spanload," and the induced drag that results from the ideal spanload is the "ideal induced drag." For a flat wing where the Trefftz-plane geometry is a horizontal line, the ideal spanload is elliptical. Conventional aircraft wings without winglets are close enough to being flat in the Trefftz-plane that their ideal spanloads are very close to elliptical. For conventional aircraft wings having vertical or near-vertical winglets (i.e., nonplanar lifting systems), the ideal spanload is generally not elliptical, but the ideal spanload can be easily calculated from conventional wing theory.

Conventional aircraft wings are generally not designed with ideal or elliptical spanloads. Instead, they are designed with compromised "triangular" spanloads that reduce structural bending loads at the wing root. Such designs trade a slight increase in induced drag for a reduction in airframe weight. The degree of compromise varies considerably from one aircraft model to another. To produce such a triangular spanload, the wing tip is typically twisted to produce "wash-out." Wash-out refers to a wing tip that is twisted so that the leading edge moves downward and the trailing edge moves upward relative to the wing root. Washing out the wing tip in this manner lowers the angle of attack of the wing tip with respect to the wing root, thereby reducing the lift distribution toward the wing tip.

Conventional winglets are typically swept aft to avoid detrimental shock wave interaction between the wing and the winglet. When such a winglet is added to an existing or "baseline" wing, the resulting spanload differs from the ideal spanload because the baseline wing was originally designed to operate efficiently without a winglet. This difference is accentuated by the compromised triangular lift distribution generally associated with conventional wings. As a result, the benefit of adding the winglet often falls far short of the benefit theoretically available from the ideal spanload.

Technical Report AFFDL-TR-76-6, entitled "Design and Analysis of Winglets for Military Aircraft," and published by the Boeing Commercial Airplane Company in 1976, provides the results from a parametric study of various types of winglets. The study included a range of winglet sweep angles, including forward sweep angles (see, for example, FIG. 43 of the Report). Apparently, however, in this study the winglets were only combined with flat (i.e., non-washed-out) wings having optimum, or nearly optimum, elliptical spanloads. The winglets were apparently not combined with conventional washed-out wings having triangular spanloads. As a result, this study failed to identify any significant benefits associated with forward swept winglets.

SUMMARY

The present invention is directed generally toward wing tip devices for use with aircraft wings, and methods for incorporating such devices into existing wing designs. An aircraft wing/winglet combination configured in accordance with one aspect of the invention includes a wing having a wing root portion and a wing tip portion. The wing root portion can be configured to be attached to an aircraft fuselage. The wing tip portion can be spaced apart from the wing root portion and can have a washout twist relative to the wing root portion. The aircraft wing/winglet combination can further include a winglet extending from the wing tip portion of the wing. In another aspect of the invention, the winglet can be swept forward relative to the wing.

In a further aspect of the invention, the winglet can include a winglet root portion fixedly attached at least proximate to the wing tip portion of the wing. The winglet root portion can define a winglet root chord, and the wing tip portion of the wing can define a wing tip chord that is greater than the winglet root chord. The wing can further include a wing leading edge portion, and the winglet can further include a winglet leading edge portion. In yet another aspect of the invention, the winglet leading edge portion can be positioned at least proximate to the wing leading edge portion.

A method for manufacturing an aircraft wing/winglet combination in accordance with one aspect of the invention includes providing a wing having a wing root portion and a wing tip portion. The wing root portion can define a wing root chord and the wing tip portion can define a wing tip chord. The wing tip chord can be offset from the wing root chord along a wing quarter-chord line and can have a wash-out twist relative to the wing root chord. In another aspect of the invention, the method can further include providing a winglet having a winglet root portion and a winglet tip portion. The winglet root portion can define a winglet root chord and the winglet tip portion can define a winglet tip chord. The winglet tip chord can be offset from the winglet root chord along a winglet quarter-chord line. In a further aspect of the invention, the method can include fixedly attaching the winglet root portion at least proximate to the wing tip portion such that the winglet quarter-chord line is swept at least generally forward relative to the wing quarter-chord line.

BRIEF DESCRIPTION OF THE DRAWINGS

FIG. 4 is an enlarged rear elevation view of the winglet of FIG. 2 configured in accordance with an embodiment of the invention.

FIGS. 5A and 5B are side elevation views of partial-chord winglets configured in accordance with embodiments of the invention.

DETAILED DESCRIPTION

The following disclosure describes tip devices for use with airfoils such as aircraft wings, and methods for incorporating such tip devices into existing wing designs. Certain specific details are set forth in the following description and in FIGS. 1–7 to provide a thorough understanding of various embodiments of the invention. Other details describing well-known structures and systems often associated with aircraft and aircraft wings are not set forth in the following description to avoid unnecessarily obscuring the description of the various embodiments of the invention.

Many of the details, dimensions, angles, and other specifications shown in the Figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 110 is first introduced and discussed with reference to FIG. 1.

Figure 1:
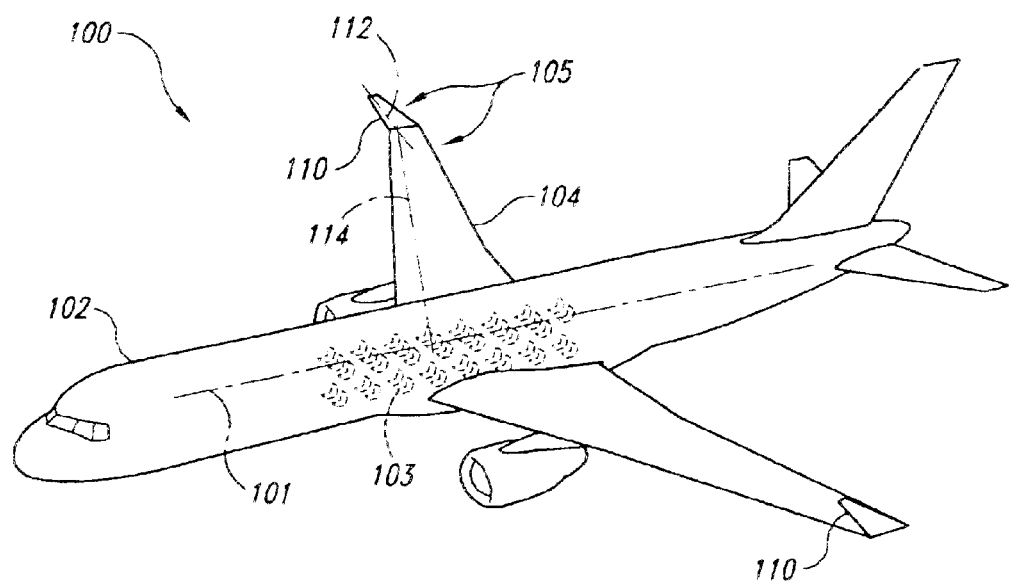
FIG. 1 is a top isometric view of an aircraft having a wing/winglet combination configured in accordance with an embodiment of the invention.

FIG. 1 is a top isometric view of an aircraft 100 having a wing/winglet combination 105 configured in accordance with an embodiment of the invention. In one aspect of this embodiment, the aircraft 100 includes an airfoil such as a wing 104 extending outwardly from a fuselage 102. The fuselage 102 can be aligned along a longitudinal axis 101 and can include a passenger compartment 103 configured to carry a plurality of passengers (not shown). In one embodiment, the passenger compartment 103 can be configured to carry at least 50 passengers. In another embodiment, the passenger compartment 103 can be configured to carry at least 150 passengers. In further embodiments, the passenger compartment 103 can be configured to carry other numbers of passengers. In still other embodiments (such as military embodiments), the passenger compartment 103 can be omitted.

In another aspect of this embodiment, the wing 104 can be an existing wing configuration to which forward-swept winglets 110 have been added to form the wing/winglet combination 105. The phrase "existing wing configuration" in this context means an existing or "baseline" wing configuration that was originally designed to operate without wing tip devices. For example, in one embodiment, the forward-swept winglets 110 ("winglets 110") can be retrofitted to an existing wing to reduce the induced drag and increase fuel efficiency. In another embodiment, the winglets 110 can be incorporated into the design of a new derivative aircraft that utilizes an existing wing configuration.

Although the winglet 110 of the illustrated embodiment is combined with a wing, in other embodiments, the winglet 110 can be combined with other types of airfoils to reduce aerodynamic drag and/or serve other purposes. For example, in one other embodiment, the winglet 110 can be combined with an aft-mounted horizontal stabilizer. In another embodiment, the winglet 110 can be combined with a forward-wing or canard to reduce the aerodynamic drag on the canard. In further embodiments, the winglet 110 can be combined with other airfoils. Furthermore, throughout this disclosure and the following claims, the term winglets shall refer to any wingtip device configured in accordance with this disclosure including, for example, both vertical winglets and horizontal span extensions.

In a further aspect of this embodiment, the wing 104 defines a wing quarter-chord line 114 that is swept at least generally aft relative to the longitudinal axis 101, and the winglet 110 defines a winglet quarter-chord line 112 that is swept at least generally forward relative to the wing quarter-chord line 114. As described in greater detail below, sweeping the winglet quarter-chord line 112 forward in this manner can favorably change the spanload on the combination of the wing 104 and the winglet 110 to provide an increased drag reduction over a conventional aft-swept winglet.

Figure 2:
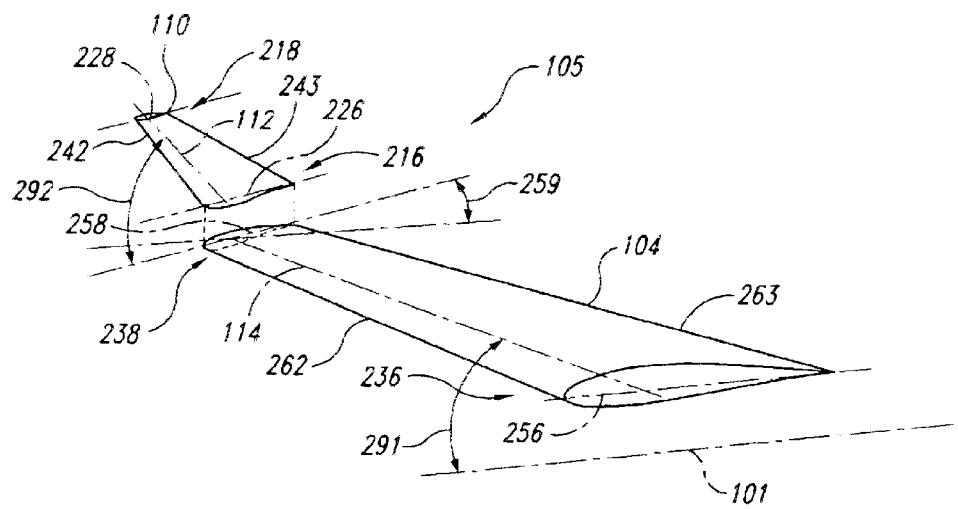
FIG. 2 is an enlarged exploded isometric view of the wing/winglet combination of FIG. 1, configured in accordance with an embodiment of the invention.

FIG. 2 is an enlarged exploded isometric view of the wing/winglet combination 105 of FIG. 1, configured in accordance with an embodiment of the invention. In one aspect of this embodiment, the wing 104 includes a wing tip portion 238 and a wing root portion 236. The wing root portion 236 can be configured to be fixedly attached to the fuselage 102 (FIG. 1) and can define a wing root chord 256. The wing tip portion 238 can similarly define a wing tip chord 258 offset from the wing root chord 256 along the wing quarter-chord line 114. The wing tip chord 258 can have a wash-out twist relative to the wing root chord 256, as illustrated by the twist angle 259. Conventional aircraft wings lacking wing tip devices typically employ such wash-out twist to reduce the lift distribution toward the wing tip and in turn reduce the bending load at the wing root. Reducing the bending load at the wing root can favorably reduce the structural weight of the wing, albeit at the expense of a slight drag increase.

In another aspect of this embodiment, the winglet 110 includes a winglet tip portion 218 and a winglet root portion 216. The winglet root portion 216 can be configured to be fixedly attached to the wing tip portion 238 of the wing 104 and can define a winglet root chord 226. The winglet tip portion 218 can similarly define a winglet tip chord 228 offset from the winglet root chord 226 along the winglet quarter-chord line 112. In a further aspect of this embodiment described in greater detail below, the winglet quarter-chord line 112 is swept at least generally forward relative to the wing quarter-chord line 114 to favorably change the spanload on the wing 104 and in turn reduce the induced drag on the wing 104.

In yet another aspect of this embodiment, the wing 104 includes a wing leading edge portion 262 and a wing trailing edge portion 263. Similarly, the winglet 110 can include a winglet leading edge portion 242 and a winglet trailing edge portion 243. In the illustrated embodiment, the winglet 110 is a full-chord winglet with the winglet leading edge portion 242 positioned at least proximate to the wing leading edge portion 262, and the winglet trailing edge portion 243 positioned at least proximate to the wing trailing edge portion 263. In other embodiments described in greater detail below, however, partial-chord winglets configured in accordance with embodiments of the invention can be fixedly attached to the wing 104 such that the winglet leading edge portion 242 and/or the winglet trailing edge portion 243 are/is not proximate to the corresponding wing leading edge portion 262 and/or the wing trailing edge portion 263, respectively.

In a further aspect of this embodiment, the wing 104 can have a general trapezoidal planform with an aspect ratio of about 10 and a taper ratio of about 0.25. In other embodiments, the wing 104 can have other aspect ratios and other taper ratios. For example, in one other embodiment, the wing 104 can have an aspect ratio greater than 10 and/or a taper ratio greater than 0.25. In another embodiment, the wing 104 can have an aspect ratio less than 10 and/or a taper ratio less than 0.25. In a further aspect of this embodiment, the wing quarter-chord line 114 can be swept aft at an angle 291 of about 35 degrees with respect to the longitudinal axis 101. In other embodiments, the wing quarter-chord line 114 can be positioned at other angles relative to the longitudinal axis 101. For example, in one other embodiment, the wing 104 can be at least generally unswept. In yet another embodiment, the wing 104 can be swept forward.

In the illustrated embodiment of FIG. 2, the winglet 110 can have a length of about 15% of the semi-span of the wing 104 and a taper ratio of about 0.50. In addition, in this embodiment, the winglet quarter-chord line 112 can be swept forward at an angle 292 of about 35 degrees with respect to the wing tip chord 258. In other embodiments, the winglet 110 can have other lengths, other taper ratios, and other sweep angles. For example, in one other embodiment, the winglet 110 can have a length of about 10% of the semi-span of the wing 104, a taper ratio of about 0.40, and a forward sweep angle of about 25 degrees with respect to the wing tip chord 258.

Figure 3:
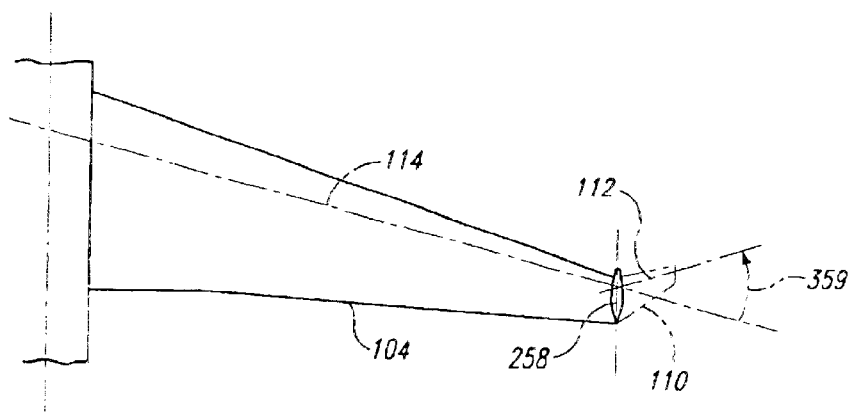
FIG. 3 is an unfolded top plan view of the wing/winglet combination of FIG. 2 illustrating relative sweep angles of the wing quarter-chord line and the winglet quarter-chord line in accordance with an embodiment of the invention.

FIG. 3 is an unfolded top plan view of the wing/winglet combination 105 of FIG. 2 illustrating the relative sweep angles of the wing quarter-chord line 114 and the winglet quarter-chord line 112 in accordance with an embodiment of the invention. For purposes of illustration, the winglet 110 is folded outward and downward in FIG. 3 about the wing tip chord 258 so that it lies in the same plane as the wing 104. This unfolded configuration illustrates that the winglet quarter-chord line 112 is swept forward with respect to the wing quarter-chord line 114, as shown by the forward sweep angle 359. Thus, throughout this disclosure, the term "forward swept winglet" shall refer to a winglet having a quarter-chord line that is swept forward relative to the wing quarter-chord line when the winglet is brought into plane with the wing as shown in FIG. 3. Note that in some embodiments the quarter-chord line of the winglet 112 may be swept aft relative to the longitudinal axis 101, but the winglet 110 may still be a "forward swept winglet" because the winglet quarter-chord line 112 is swept forward relative to the wing quarter-chord line 114.

FIG. 4 is an enlarged rear elevation view of the winglet 110 of FIG. 2 configured in accordance with an embodiment of the invention. In one aspect of this embodiment, the winglet 110 extends at least generally upward with respect to the wing 104 such that the winglet 110 is at least generally perpendicular to the wing 104. In other embodiments, the winglet 110 can extend at other angles with respect to the wing 104. For example, in one other embodiment, as shown by a first phantom position 471, the winglet 110 can extend at least generally outward from the wing 104 in a horizontal direction. In another embodiment, as illustrated by a second phantom position 472, the winglet 110 can extend at least generally upward and inward with respect to the wing 104. In a further embodiment, as illustrated by a third phantom position 473, the winglet 110 can extend at least generally downward and inward with respect to the wing 104. In other embodiments, the winglet 110 can assume a range of different cant angles between the second position 472 and the third position 473. Such cant angles can depend on a number of factors, including, for example, mitigating transonic shock interaction, reducing structural loads, and/or optimizing the reduction of aerodynamic drag.

In still further embodiments, winglets in accordance with the present disclosure can be combined with a range of wing configurations to provide reductions in induced drag. In one embodiment, for example, such winglets can be combined with wings having little or no dihedral. In another embodiment, such winglets can be combined with wings having some dihedral. In yet further embodiments, such winglets can be combined with wings having some anhedral.

FIGS. 5A and 5B are side elevation views of partial-chord winglets 510a and 510b, respectively, configured in accordance with embodiments of the invention. Referring first to FIG. 5A, in one aspect of this embodiment, the partial-chord winglet 510a includes a winglet root chord 526a that is shorter than the adjacent wing tip chord 258. In another aspect of this embodiment, the partial-chord winglet 510a includes a winglet leading edge portion, 542a and a winglet trailing edge portion 543a. The winglet leading edge portion 542a can be positioned at least proximate to the wing leading edge portion 262, and the winglet trailing edge portion 543a can be offset from the wing trailing edge portion 263 toward the wing leading edge portion 262. In the embodiment of FIG. 5A, the partial-chord winglet 510a is swept forward. In other embodiments, however, partial-chord winglets configured in accordance with embodiments of the invention can be swept aft. For example, as shown in FIG. 5B, the partial-chord winglet 510b includes a quarter-chord line 512 that is swept at least generally aft. It is expected that the forward position of the partial-chord winglet 510b can provide additional drag reduction benefits over a similarly configured aft-swept winglet positioned more toward the trailing edge portion 263 of the wing 104.

Figures 6, 7:
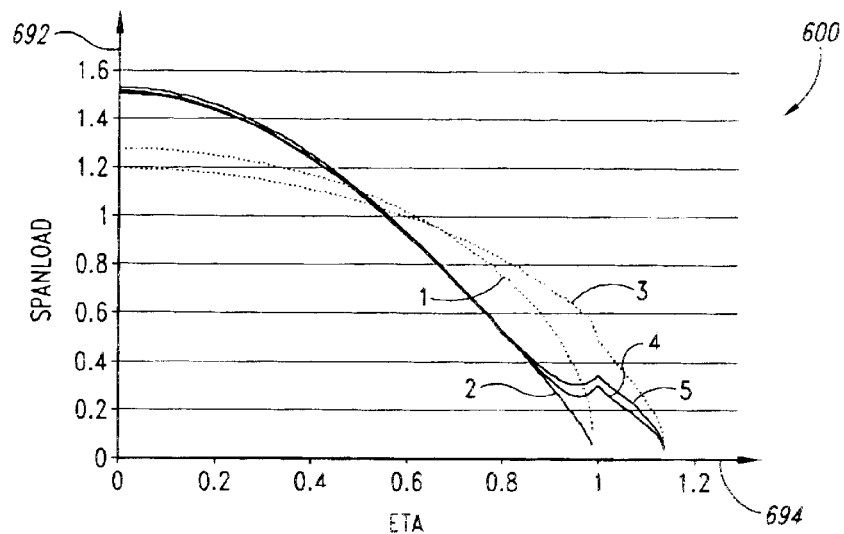
FIG. 6 illustrates a graph showing a reduction in induced drag that can be achieved with a forward-swept winglet configured in accordance with an embodiment of the invention.
FIG. 7 illustrates a table comparing a drag reduction of an aft-swept winglet to a drag reduction of a forward-swept winglet in accordance with an embodiment of the invention.

FIG. 6 illustrates a graph 600 showing a reduction in induced drag that can be achieved by a forward-swept winglet configured in accordance with an embodiment of the invention. Spanloads 1–5 for various wing and wing/winglet configurations, as measured along a vertical axis 692, are plotted against a nondimensional spanwise coordinate eta, as measured along a horizontal axis 694. An eta value of 1.00 corresponds to the tip of the wing 104 (FIGS. 1–3), and an eta of 1.15 corresponds to the tip of the winglet 110 (also shown in FIGS. 1–3). The data presented in FIG. 6 is theoretical and based on calculations. Accordingly, FIG. 6 illustrates an expected reduction in induced drag, as opposed to a measured reduction.

The total vertical lift is the same for each of the spanloads 1–5 shown in FIG. 6. Spanload 1 is a theoretical ideal spanload (i.e., an elliptical spanload) for a flat wing having the same span as the wing 104. Spanload 2 is a compromised (i.e., triangular) spanload for the wing 104 with conventional wing tip wash-out. For purposes of illustration, the reduced tip loading illustrated in FIG. 6 for spanload 2 may be somewhat exaggerated over that typically encountered in practice. Spanload 3 is a theoretical ideal spanload for a wing with a vertical winglet. The wing/winglet combination associated with spanload 3 has accordingly been optimized to provide the optimum spanload shown. This optimization necessarily includes changing the wash-out of the wing 104 because, as noted above, this wash-out twist would otherwise produce a spanload with much less load on the outboard portion of the wing (e.g., the eta range between 0.5 and 1.0), similar to spanload 4. Spanload 4 is a theoretical best available spanload that can be achieved by attaching a 35 degree aft-swept winglet to the wing 104 without changing the twist of the wing 104. For both spanloads 4 and 5, the twist of the winglet is optimized to produce the lowest possible induced drag consistent with the twist of the existing wing. For comparison, spanload 5 is a theoretical best available spanload that can be achieved by attaching a 35 degree forward-swept winglet to the wing 104 without changing the twist of the wing 104. Comparing spanload 4 to spanload 5 shows that a forward-swept winglet can increase the spanload on both the tip portion of the baseline wing and the winglet, as compared to a comparable aft-swept winglet. One advantage of this feature is that increasing the spanload in this manner can provide a corresponding reduction in induced drag.

FIG. 7 illustrates a table 700 comparing the drag reduction of spanload 4 (aft-swept winglet) to the drag reduction of spanload 5 (forward-swept winglet). Spanload identifiers are shown in column 702, winglet sweep is shown in column 704, and induced drag increments relative to the baseline wing 104 without any winglet and as percentages of the ideal induced drag of the baseline wing 104 without any winglets are shown in column 706. Referring first to spanload 4, the aft-swept winglet is seen to provide an induced drag reduction equivalent to 6.3% of the ideal induced drag (spanload 1) as compared to the baseline wing 104 without a winglet (spanload 2). Referring next to spanload 5, however, the forward-swept winglet is seen to provide an induced drag reduction equivalent to 7.9% of the ideal induced drag as compared to the baseline wing 104 without a winglet. Accordingly, in the illustrated embodiment, the data in table 700 suggests that a forward-swept winglet configured in accordance with the present invention can provide about a 25% improvement in drag reduction over a comparable aft-swept winglet.

From the foregoing, it will be appreciated that specific embodiments of the invention have been described herein for purposes of illustration, but that various modifications may be made without deviating from the spirit and scope of the invention. Accordingly, the invention is not limited, except as by the appended claims.

I claim:

1. An airfoil/winglet combination comprising:
   an airfoil having an airfoil root portion and an airfoil tip portion spaced apart from the airfoil root portion, the airfoil tip portion having a wash-out twist relative to the airfoil root portion; and
   a winglet extending outwardly from the airfoil tip portion of the airfoil, the winglet being swept forward relative to the airfoil and fixedly attached directly to the airfoil tip portion in the absence of a second winglet extending outwardly from the airfoil tip portion, wherein the airfoil includes an airfoil trailing edge portion and the winglet includes a winglet trailing edge portion, the winglet trailing edge portion being positioned forward of the airfoil trailing edge portion defining a space therebetween.

2. The airfoil/winglet combination of claim 1 wherein the winglet includes a winglet root portion attached at least proximate to the airfoil tip portion, wherein the winglet root portion defines a winglet root chord and the airfoil tip portion defines an airfoil tip chord, the winglet root chord being different than the airfoil tip chord.

3. The airfoil/winglet combination of claim 1 wherein the airfoil includes an airfoil leading edge portion and the winglet includes a winglet leading edge portion, the winglet leading edge portion being positioned at least proximate to the airfoil leading edge portion.

4. The airfoil/winglet combination of claim 1 wherein the airfoil includes an airfoil leading edge portion and the winglet includes a winglet leading edge portion, the winglet leading edge portion being positioned at least proximate to the airfoil leading edge portion, and wherein the winglet further includes a winglet root portion defining a winglet root chord, the airfoil tip portion of the airfoil defining an airfoil tip chord greater than the winglet root chord.

5. The airfoil/winglet combination of claim 1 wherein the airfoil includes an airfoil leading edge portion and the winglet includes a winglet leading edge portion, the winglet leading edge portion being positioned at least proximate to the airfoil leading edge portion, and wherein the winglet further includes a winglet root portion defining a winglet root chord, the airfoil tip portion of the airfoil defining an airfoil tip chord about twice as long as the winglet root chord.

6. The airfoil/winglet combination of claim 1 wherein the airfoil extends in a first direction and the winglet extends in a second direction, the second direction being at least generally perpendicular to the first direction.

7. The airfoil/winglet combination of claim 1 wherein the airfoil extends in a first direction and the winglet extends in a second direction, the second direction being at least generally perpendicular and upward relative to the first direction.

8. The airfoil/winglet combination of claim 1 wherein the airfoil includes an aircraft wing, the aircraft wing having a wing root portion configured to be attached to an aircraft fuselage and a wing tip portion spaced apart from the wing root portion, the wing tip portion having a wash-out twist relative to the wing root portion.

9. The airfoil/winglet combination of claim 1 wherein the airfoil includes a canard, the canard having a canard root portion configured to be attached to an aircraft fuselage and a canard tip portion spaced apart from the canard root portion, the canard tip portion having a wash-out twist relative to the canard root portion.

10. An aircraft system comprising:
    a wing having a wing tip portion and a wing root portion, the wing root portion defining a wing root chord, the wing tip portion defining a wing tip chord, the wing tip chord having a wash-out twist relative to the wing root chord and being offset from the wing root chord along a wing quarter-chord line; and
    a winglet having a winglet tip portion and a winglet root portion, the winglet root portion defining a winglet root chord and being fixedly attached directly to the wing tip portion of the wing in the absence of a second winglet extending outwardly from the wing tip portion, the winglet tip portion defining a winglet tip chord and being offset from the winglet root chord along a winglet quarter-chord line, the winglet quarter-chord line being swept at least generally forward relative to the wing quarter-chord line wherein the wing includes a wing trailing edge portion and the winglet includes a winglet trailing edge portion, the winglet trailing edge portion being positioned forward of the wing trailing edge portion defining a space therebetween.

11. The aircraft system of claim 10 wherein the wing includes a wing leading edge portion and the winglet includes a winglet leading edge portion, the winglet leading edge portion being positioned at least proximate to the wing leading edge portion.

12. The aircraft system of claim 10 wherein the wing includes a wing leading edge portion and the winglet includes a winglet leading edge portion, wherein the winglet leading edge portion is positioned at least proximate to the wing leading edge portion, and wherein the wing tip chord is greater than the winglet root chord.

13. The aircraft system of claim 10 wherein the wing includes a wing leading edge portion and the winglet includes a winglet leading edge portion, wherein the winglet leading edge portion is positioned at least proximate to the wing leading edge portion, and wherein the wing tip chord is about twice as long as the winglet root chord.

14. The aircraft system of claim 10 wherein the wing defines a first plane and the winglet defines a second plane, and wherein the first and second planes are at least generally parallel to each other.

15. The aircraft system of claim 10 wherein the winglet quarter-chord line is swept forward to form an angle of about 55 degrees with respect to the wing tip chord.

16. The aircraft system of claim 10, further comprising a fuselage, the wing extending outwardly from the fuselage.

17. The aircraft system of claim 16 wherein the fuselage is aligned along a longitudinal axis, wherein the wing quarter-chord line is swept at least generally aft relative to the longitudinal axis, and wherein the winglet quarter-chord line is swept at least generally forward relative to the longitudinal axis.

18. The aircraft system of claim 16 wherein the fuselage includes a passenger compartment configured to carry at least 50 passengers.

19. A method for manufacturing an aircraft wing/winglet combination, the method comprising:

providing a wing having a wing root portion and a wing tip portion, the wing root portion configured to be attached toward a fuselage of an aircraft and defining a wing root chord, the wing tip portion defining a wing tip chord and being offset from the wing root chord along a wing quarter-chord line, the wing tip chord having a wash-out twist relative to the wing root chord;

providing a winglet having a winglet root portion and a winglet tip portion, the winglet root portion defining a winglet root chord, the winglet tip portion defining a winglet tip chord, the winglet tip chord being offset from the winglet root chord along a winglet quarter-chord line; and fixedly attaching the winglet root portion directly to the wing tip portion in the absence of a second winglet extending outwardly from the wing tip portion and such that the winglet quarter-chord line is swept at least generally forward relative to the wing quarter-chord line wherein the wing includes a wing trailing edge and the winglet includes a winglet trailing edge, the winglet trailing edge being positioned forward of the wing trailing edge defining a space therebetween.

20. The method of claim 19 wherein providing a wing includes providing a wing having a wing leading edge, wherein providing a winglet includes providing a winglet having a winglet leading edge, and wherein fixedly attaching the winglet root portion directly to the wing tip portion includes positioning the winglet leading edge at least proximate to the wing leading edge.

21. The method of claim 19 wherein the wing tip chord is greater than the winglet root chord, wherein providing a wing includes providing a wing having a wing leading edge, wherein providing a winglet includes providing a winglet having a winglet leading edge, and wherein fixedly attaching the winglet root portion directly to the wing tip portion includes positioning the winglet leading edge at least proximate to the wing leading edge.

22. The method of claim 19 wherein fixedly attaching the winglet root portion directly to the wing tip portion includes positioning the winglet quarter-chord at about a 90 degree angle relative to the wing quarter-chord line.

23. The method of claim 19 wherein fixedly attaching the winglet root portion directly to the wing tip portion includes positioning the winglet to be at least generally in-plane with wing.

24. A method for manufacturing a second wing from a first wing, the first wing having a wing root portion and a wing tip portion, the wing root portion configured to be attached toward a fuselage of an aircraft and defining a wing root chord, the wing tip portion defining a wing tip chord and being offset from the wing root chord along a wing quarter-chord line, the wing tip chord having a wash-out twist relative to the wing root chord, the method comprising:

providing a winglet having a winglet root portion and a winglet tip portion, the winglet root portion defining a winglet root chord, the winglet tip portion defining a winglet tip chord and being offset from the winglet root chord along a winglet quarter-chord line; and fixedly attaching the winglet root portion directly to the wing tip portion in the absence of a second winglet extending outwardly from the wing tip portion and such that the winglet quarter-chord line is swept at least generally forward relative to the wing quarter-chord line wherein the first wing includes a wing trailing edge and the winglet includes a winglet trailing edge, the winglet trailing edge being positioned forward of the wing trailing edge defining a space therebetween.

25. The method of claim 24 wherein the first wing further includes a wing leading edge, wherein providing a winglet includes providing a winglet having a winglet leading edge, and wherein fixedly attaching the winglet root portion directly to the wing tip portion includes positioning the winglet leading edge directly to the wing leading edge.

26. The method of claim 24 wherein the wing tip chord is greater than the winglet root chord and the first wing further includes a wing leading edge; wherein providing a winglet includes providing a winglet having a winglet leading edge, and wherein fixedly attaching the winglet root portion directly to the wing tip portion includes positioning the winglet leading edge directly to the wing leading edge.

27. The method of claim 24 wherein the wing root portion is configured to be fixedly attached to an aircraft fuselage defining a longitudinal axis, wherein fixedly attaching the winglet root portion at least proximate to the wing tip portion includes fixedly attaching the winglet root portion such that the winglet quarter-chord line is swept at least generally forward relative to the longitudinal axis of the fuselage.

28. The method of claim 24 wherein the wing root portion is configured to be fixedly attached to an aircraft fuselage defining a longitudinal axis, wherein fixedly attaching the winglet root portion at least proximate to the wing tip portion includes fixedly attaching the winglet root portion such that the winglet quarter-chord line is swept at least generally aft relative to the longitudinal axis of the fuselage.

29. A method for improving the drag characteristics of a wing having a wing root portion and a wing tip portion, the wing root portion defining a wing root chord and being configured to be attached toward a fuselage of an aircraft, the wing tip portion defining a wing tip chord offset from the wing root chord along a wing quarter-chord line, the method comprising:

changing the planform of the wing by:
providing a winglet having a winglet root portion and a winglet tip portion, the winglet root portion defining a winglet root chord, the winglet tip portion defining a winglet tip chord, the winglet tip chord being offset from the winglet root chord along a winglet quarter-chord line; and
fixedly attaching the winglet to the wing by fixing the winglet root portion directly to the wing tip portion in the absence of a second winglet extending outwardly from the wing tip portion, wherein when the winglet is fixedly attached to the wing, the winglet quarter-chord line is swept at least generally forward relative to the wing quarter-chord line wherein the wing includes a wing trailing edge and the winglet includes a winglet trailing edge, the winglet trailing edge being positioned forward of the wing trailing edge defining a space therebetween.

30. The method of claim 29 wherein the wing at least generally defines a first plane and the winglet at least generally defines a second plane, and wherein when the winglet is fixedly attached to the wing, the second plane is positioned at least generally perpendicular to the first plane.

31. The method of claim 29 wherein fixing the winglet root portion at least proximate to the wing tip portion includes fixedly attaching the winglet to a portion of the wing having a wash-out twist relative to the wing root chord.

32. A winglet for use with an aircraft, the winglet comprising:

a winglet root portion, wherein the winglet root portion is configured to fixedly attached directly to a wing tip portion of a wing of the aircraft in the absence of a second winglet extending outwardly from the wingtip portion, the wing having a washout twist; and
a winglet tip portion, wherein the winglet tip portion is swept forward relative to the winglet root portion a winglet trailing edge portion, wherein the winglet trailing edge portion is configured to be positioned forward of a trailing edge portion of the wing defining a space therebetween.

33. The winglet of claim 32 wherein the winglet root portion is configured to be attached to a wing having at least one strut carried on the wing for supporting a jet engine.

* * * * *